United States Patent [19]
Barbey et al.

[11] Patent Number: 4,654,249
[45] Date of Patent: Mar. 31, 1987

[54] BIAXIALLY DRAWN, FILLED POLYESTER FILM SUBSTRATES

[75] Inventors: Jacques Barbey; Marie-Oldile Jacquier, both of Miribel, France

[73] Assignee: Rhone-Poulenc Films, Courbevoie, France

[21] Appl. No.: 630,415

[22] Filed: Jul. 13, 1984

[30] Foreign Application Priority Data

Jul. 13, 1983 [FR] France ................. 83 11930

[51] Int. Cl.$^4$ .............................................. D06N 7/04
[52] U.S. Cl. .................................. 428/148; 361/312;
427/127; 427/128; 428/172; 428/323; 428/325;
428/328; 428/339; 428/480; 428/694; 428/900;
428/910; 524/413; 524/539
[58] Field of Search ............... 428/323, 325, 339, 328,
428/694, 900, 172, 148, 910, 480; 427/127, 128;
524/430; 361/312; 523/181

[56] References Cited

U.S. PATENT DOCUMENTS 3,221,226 11/1965 Kennedy et al. .................. 317/258
4,348,446 9/1982 Mitsuishi et al. .................. 428/694

FOREIGN PATENT DOCUMENTS 0066997 12/1982 European Pat. Off. .

OTHER PUBLICATIONS

Chemical Abstract, vol. 89, 130959t assigned to Teijin.
Chemical Abstract, vol. 90, 24298n assigned to Toray Industries.

Primary Examiner—Jacob Ziegler
Attorney, Agent, or Firm—Burns, Doane, Swecker & Mathis

[57] ABSTRACT

Biaxially drawn, filled polyester film substrates, well adapted for the manufacture of magnetic recording tapes, are comprised of a biaxially stretched thermoplastic film matrix including a particulate filler material distributed therethrough, said filler material comprising (a) from about 0.01% to 1% by weight thereof of kaolinite particles having a mean particle size no greater than about 1 micron, and (b) from about 0.01% to 1% by weight thereof of titanium oxide particles also having a mean particle size no greater than about 1 micron.

14 Claims, No Drawings

BIAXIALLY DRAWN, FILLED POLYESTER FILM SUBSTRATES

BACKGROUND OF THE INVENTION

1. Field of the Invention

The present invention relates to novel biaxially drawn polyester films containing fillers, which have improved surface characteristics and properties, and also to the use of such films, especially in the manufacture of magnetic tapes or capacitors therefrom.

2. Description of the Prior Art

In order to be advantageously used as base substrates for magnetic tapes, polyester films must satisfy two requirements in particular, which in practice are ofttimes competing or contradictory. On the one hand, these films must have a good slip, enabling them to be used in industry, and, in particular, to be rolled up, and on the other hand, the production of high quality magnetic tapes requires films having face surfaces which are as smooth as possible, such that defects in the reproduction of signals which are to be recorded thereon are avoided to the greatest possible extent.

One solution frequently proposed for improving the slip of the films by reducing their coefficients of friction consists of incorporating inert, typically inorganic fillers into the polyester. Thus, kaolinite, silica and other inorganic metal oxides or salts are commonly used for this purpose. However, the presence of these fillers on the face surfaces of the films results in disadvantages at the magnetic tape stage. This is all the more troublesome because attempts are currently being made, in particular in the field of video tapes, to produce magnetic tapes having a face surface with the minimum possible number of defects. This quite obviously requires the base films to themselves have excellent surface characteristics and, notably, an increasingly low degree of roughness consistent with the quality required of the desired finished products.

The surface roughness of a film is typically expressed with reference to two particular values:

(i) a value corresponding to the total or maximum roughness $R_t$ (also called PV, representing the expression "peak-to-valley"), which is defined as the maximum depth of the roughness; and (ii) a value corresponding to the arithmetic average roughness $R_a$ (also called CLA, representing the expression "center line average").

The total or maximum roughness $R_t$ and the average roughness $R_a$ are defined and their measurement is described in Japanese Industrial Standard JIS B 0601-1982.

Other fillers are also used, such as, for example, titanium dioxide; the latter affords a better compromise between the coefficient of friction and the roughness, but the substantially haze which it imparts to the film makes it difficult to recover the product waste, although this recovery is economically necessary.

It has also been proposed, in Japanese Patent Application No. 87,936/1975 published under No. 40,929/1980, to use inert fillers whose particles are essentially distributed in two populations of different sizes; some of the particles have a size of 3 to 6 microns and other particles have a size of 1 to 2.5 microns.

SUMMARY OF THE INVENTION

Accordingly, a major object of the present invention is the provision of improved biaxially drawn polyester films having enhanced surface characteristics and containing, as fillers, at least two inert inorganic compounds which differ in nature but not necessarily in the size distribution of their respective particles.

Briefly, the present invention features biaxially drawn, oriented or stretched polyester films containing fillers, and comprising, by weight, relative to the polyester:

(a) from 0.01% to 1% of kaolinite having a mean particle size of less than or equal to 1 micron; and (b) from 0.01% to 1% of titanium oxide having a mean particle size of less than or equal to 1 micron.

By "mean particle size" there is intended the value of the spherical diameter corresponding to 50% of the volume of all of the particles and selected from the cumulative distribution curve relating particle volume to particle diameter.

By "spherical diameter" of a particle there is intended the diameter of a sphere having a volume equivalent to that of the said particle.

DETAILED DESCRIPTION OF THE INVENTION

More particularly according to the present invention, the subject films preferably comprise kaolinite and titanium oxide particulates having a mean particle size less than or equal to 0.7 microns.

The polyester which is used to prepare the films according to the invention can be any known polyester as obtained from a dicarboxylic acid or its lower alkyl esters, such as terephthalic acid, isophthalic acid, orthophthalic acid, naphthalene-2, 5-dicarboxylic acid, naphthalene-2, 6-dicarboxylic acid, naphthalene-2, 7-dicarboxylic acid, succinic acid, sebacic acid, adipic acid, azelaic acid, diphenyldicarboxylic acid and hexahydroterephthalic acid, and from one or more diols such as ethylene glycol, propane-1, 3-diol, butane-1, 4-diol, neopenthlglycol and cyclohexane-1, 4-dimethanol.

In general, the polyester used is a homopolymer or a copolymer containing essentially alkylene terephthalate units. Preferably, the said polyester contains at least 80% by weight of ethylene glycol terephthalate recurring units and, even more preferably, at least 90% by weight of such recurring units. The polyester can also be a mixture of several homopolymers of which 80% by weight, and preferably 90% by weight, comprises polyethylene glycol terephthalate.

The preparation of polyesters of this type is in itself well known to this art.

Typically, such preparation comprises a stage involving interexchange (or transesterification) between a lower alkyl ester of terephthalic acid (such as dimethyl terephthalate) and ethylene glycol, in the presence of a catalyst such as, for example, manganese acetate, calcium acetate or magnesium acetate.

Next follows the stage involving polycondensation of the ethylene glycol terephthalate in the presence of a polycondensation catalyst such as antimony oxide or a germanium compound and, most commonly, in the presence of a phosphorus compound such as phosphorous acid, phosphoric acid, or esters thereof.

The fillers are preferably introduced and incorporated during the polycondensation stage in the form of a suspension of the particles in the diol used.

Suspensions of this type can be produced by simply grinding the filler or fillers and the ethylene glycol; they can also be produced by grinding followed by centrifugation, which makes it possible to remove the largest particles and the particle agglomerates. The filler suspensions can also be homogenized by known techniques such as, for example, ultrasound treatment.

The following process embodiments can be used, in particular, to prepare the films according to the invention:

(i) the two fillers can be introduced in the form of two suspensions in ethylene glycol or alternatively in the form of a common suspension of the two fillers in ethylene glycol, during the production of the polyester; or (ii) each of the fillers can be introduced into a different batch of polyester, the two polyesters thus obtained, respectively containing kaolinite and titanium oxide as fillers, then being mixed, before extrusion, with (if necessary) a polyester not containing a filler.

The latter embodiment has the practical advantage of making it possible to prepare films according to the invention, containing various respective proportions of kaolinite and titanium oxide, by using only two batches of polyester containing one filler and, if necessary, a batch of polyester devoid of filler.

The weight ratio of kaolinite/titanium oxide in the films according to the invention can vary over wide limits. This weight ratio advantageously ranges from 0.2 to 5.

It is preferred to utilize a weight ratio of kaolinite/titanium oxide of 0.5 to 2 in the films according to the invention. The overall proportion of these fillers in the films is generally 0.05% to 1.2% by weight, relative to the polyester.

Preferably, use of the subject films for the preparation of magnetic tapes requires an overall proportion of kaolinite+titanium oxide of 0.1% to 0.7% by weight, relative to the polyester.

The biaxially drawn polyester films according to the present invention can be prepared by first extruding the polyester to provide an amorphous film containing the kaolinite and the titanium oxide, and then by biaxially drawing this amorphous film in a manner which is in itself known. The drawing or stretching can be carried out in successive steps: firstly drawing in the machine direction (longitudinal drawing) and then drawing perpendicular to the machine direction (transverse drawing), or vice versa, namely, transverse drawing followed by longitudinal drawing.

In general, the longitudinal drawing is carried out to a ratio of 3 to 5 (namely, that the length of the drawn film is from 3 to 5 times the length of the amorphous film) and at a temperature of 80° to 100° C., and the transverse drawing is carried out to a ratio of 3 to 5 and at a temperature of 90° to 120° C.

The drawing can also be carried out simultaneously, namely, simultaneously in the longitudinal direction and in the transverse direction, for example, in a ratio of 3 to 5 and at a temperature of 80° to 100° C. After drawing, the film is heat-set in a manner which is also in itself known, generally at a temperature of 180° to 230° C.

The films prepared in this manner typically have a thickness of 1 to 50 microns, depending upon the use for which they are intended. However, it is quite obvious that it is possible, if desired, to have thicker films according to the invention.

The films according to the invention have good surface properties, enabling them to be used for demanding applications such as magnetic video tapes.

In general, the total roughness $R_t$, as defined above, of the films according to the invention varies from 0.05 to 0.5.

The average roughness $R_a$, also defined above, usually varies from 0.005 to 0.05.

Another important characteristic of the films is their coefficient of dynamic friction $\mu_k$, which makes it possible to assess the slip of said films and hence their ability to be rolled up under industrial conditions and, more generally, their machinability.

The coefficient of dynamic friction $\mu_k$ defined and its method of measurement is described on page 11 (point 3) of the European Patent Application published under No. 66,997.

The coefficient of dynamic friction $\mu_k$ of the films according to the present invention most commonly ranges from 0.15 to 0.5.

A property relating to the surface of the films which is important is the peak height distribution (or PHD). To do this, it is first necessary to define the concept of a peak. Within the scope of the present invention, a peak is defined as being a protuberance from and on the surface of the film.

The peak height can be measured by any interferometric method suitable for this purpose. For example, it is possible to use an interferometric method with detection of the phase amplitude [see, for example, the method described by G. Roblin, *J. Optics (Paris)*, Volume 8, No. 5, pages 309–318 (1977)]. Thus, interferometry can be used to determine the peak heights and conveniently to evaluate the number of peaks having heights within ranges whose value is a fraction of the wavelength used for the measurement. The limits of the ranges, namely, the extent of the range used for counting, can be modified and fixed as required. For example, it is possible to determine the number of peaks per mm² within size ranges of:

0.15 μm to 0.29 μm
0.29 μm to 0.44 μm
0.44 μm to 0.79 μm.

Yet another significant characteristic of the films to be used as bases for magnetic tapes is the presence of defects due to the presence of peaks which are excessively high in relation to the other surface unevennesses (it is well known that the presence of these defects is disadvantageous because it in fact results in losses of information and hence faults, such as "drop out" in the case of magnetic video tapes). The interferometric measurement described above is used to determine the number of defects having a height of 1 micron or more per square centimeter of surface.

Finally, another value which characterizes the films containing fillers is the one which measures their haze. The measurement of this haze is carried out according to ASTM Standard D 1003. The haze of the films containing titanium oxide as a filler is generally too high for the waste from these films to be recovered, in particular if this waste must be recycled into films for use in packaging.

An indirect advantage of the films according to the invention is that it is possible, if desired, to reduce their overall proportion of fillers and consequently to substantially reduce the value of the haze, without thereby increasing the coefficient of friction to a prohibitive extent.

Films containing fillers can thus be obtained which have a haze compatible with recycling of the waste, if desired.

Another object of the present invention is to use the biaxially drawn polyester films containing fillers, described above, for the preparation of magnetic tapes. These tapes can be used, in particular, for recording sound (audio tapes), images (video tapes) or various other data (computer tapes).

These magnetic tapes are obtained by coating the polyester films with layers of metal compounds appropriate to the various intended uses.

The present invention also envisages magnetic tapes manufactured in this manner from the polyester films containing kaolinite and titanium oxide as fillers.

Finally, the films according to the invention can also be used as dielectric layers in capacitors.

In order to further illustrate the present invention and the advantages thereof, the following specific examples are given it being understood that same are intended only as illustrative and in nowise limitative.

EXAMPLE 1

(A) Preparation of a polyethylene glycol terephthalate containing titanium oxide as a filler (a) Interexchange 142.5 kg of dimethyl terephthalate at 155° C., 86.3 kg of ethylene glycol at 110° C., 99.5 g of calcium acetate and 71.3 g of antimony oxide were charged into an autoclave.

The resulting mixture was agitated and the methanol formed was distilled.

The amount of phosphoric acid necessary to prevent precipitation of the calcium acetate in the polymer was then charged into the reaction mixture.

3.5 kg of a 20% strength by weight suspension of $TiO_2$ in ethylene glycol were then added.

This suspension was prepared in the following manner:

(1) the following materials were mixed cold for about 1 hour in a turbine paste-mixer:
 (i) 62 kg of HOMBITAN LW-S $TiO_2$ marketed by the Sachtleben Company and
 (ii) 56 kg of ethylene glycol;
(2) this suspension was finely dispersed by successive passes through two ball mills operating continuously (filled with balls having a diameter of from 1 to 1.5 millimeters);
(3) the ground suspension was then diluted to 20%; and
(4) the suspension was then stored under agitation. The $TiO_2$ had a mean particle size of 0.4 micron. The mean particle size of the suspended filler was measured using a particle size analyzer operating by centrifugation: instrument of trademark HORIBA, type Capa 500.

After the $TiO_2$ suspension had been introduced, the excess ethylene glycol was distilled until the temperature of the reaction mixture reached 260° C.

The mixture obtained was transferred to the polycondensation autoclave, after filtration.

(b) Polycondensation:

The polycondensation autoclave comprised an agitator.

Polycondensation commenced at 265° C. The apparatus was placed under reduced pressure (40 millimeters of mercury and then 1 millimeter of mercury).

Polycondensation was continued until a polyester having an intrinsic viscosity of 0.65 dl/g (measured in ortho-chlorophenol 25° C. in 1% strength solution) was obtained. The polyethylene glycol terephthalate (I) obtained was collected and extruded in the form of granules. It contained 0.50% by weight of $TiO_2$, relative to the actual polymer.

(B) Preparation of polyethylene glycol terephthalate containing kaolinite as a filler The procedure followed was the same as under A, but the kaolinite suspension was prepared in the following manner:

The following materials were charged into a mill containing glass balls having a diameter of 3 millimeters and driven by a turbine:
 (i) 28.5 kg of ethylene glycol;
 (ii) 19 kg of HG 90 kaolin marketed by Huber; and
 (iii) 30 g of dispersant.

Grinding was continued for 1 hour.

The ground suspension was filtered and the filtrate was then diluted to 15% strength by weight with ethylene glycol and heated.

The dilute kaolinite suspension was centrifuged in a centrifuge whose bowl mouth had a G value of more than 4,500.

The concentration of kaolinite in the suspension recovered from the centrifuge was 10% by weight.

The kaolinite suspension prepared in this manner was introduced into the interexchange autoclave in the same fashion as the $TiO_2$ suspension.

Two batches of polyethylene glycol terephthalate containing kaolinite as a filler were thus prepared:

batch II containing 0.40% by weight of kaolinite, relative to the polymer (the mean particle size of the kaolinite used was 0.5 micron); and batch III containing 0.40% by weight of kaolinite, relative to the polymer (the mean particle size of the kaolinite used was 0.6 micron).

(C) Preparation of polyethylene glycol terephthalate (PET) containing no filler

The procedure was as described above, but no filler was added to the polymer.

This gave batch IV of PET containing no filler.

EXAMPLES 2 to 8

Different films were extruded starting from various relative proportions of polymers I, II (or III) and IV, the preparation of which has been described above.

The intimate mixing of the polymers was done when the granules were charged into the extruder.

After an amorphous film had been extruded, it was drawn, first longitudinally to a ratio of about 3.7 at 90° C., and then transversely to a ratio of about 3.7 at 110° C.

The films thus obtained were heat-set at 210° C.

These films had a thickness of about 14.5 microns.

The measurements carried out on these films were as follows:

(1) Measurement of the roughness (total and average) using a perthometer of trademark PERTHEN, equipped with an FT 25 external reference probe (radius of curvature of the diamond: 3.5 microns):
 probing length: 1.5 mm
 cut-off filter wavelength: 0.08 mm.

(2) Measurement of the haze using a hazemeter of trademark GARDNER.

(3) Measurement of the coefficient of dynamic friction $\mu_k$ by the method indicated above.

$\mu_k$ was determined by running a 25 mm wide strip of film over a fixed metal roller of diameter 25 mm and of roughness $R_t$ equal to 0.3 micron.

The speed of travel was 5 meters/minute and the length of film tested was 100 to 150 meters.

(4) Measurement of the PHD: this was carried out by the method also described above.

Films corresponding to controls a, b and c and to Examples 2, 3, 4, 5, 6, 7 and 8 were prepared and tested in this manner.

The characteristics of these films are reported in the Table below, together with the relative proportions of polymers I II (or III) and IV used to prepare them.

TABLE

| TESTS | TYPE OF FILLER | PROPORTIONS OF THE VARIOUS POLYMERS % | MEAN PARTICLE SIZE | FILLER POLYESTER (% BY WEIGHT) | Haze % | $\mu K$ 0 | $\mu K$ 100$\mu$ | $R_T$ (in $\mu$m) | $R_A$ (in $\mu$m) | PHD° |
|---|---|---|---|---|---|---|---|---|---|---|
| CONTROL A | KAOLINITE | 100% of II | 0.5 | 0.40 | 5 | 0.25 | 0.5 | 0.19 | 0.02 | 2020; 9,5; 0,5 |
| CONTROL B | KAOLINITE | 100% of III | 0.6 | 0.40 | 6.4 | 0.25 | 0.35 | 0.25 | 0.025 | 3110; 190; 33 |
| CONTROL C | T$_i$O$_2$ | 50% of I<br>50% of IV | 0.4 | 0.25 | 12.3 | 0.2 | 0.3 | 0.07 | 0.007 | 545; 3,3; 0.8 |
| EXAMPLE 2 | KAOLINITE<br>+<br>T$_i$O$_2$ | 25% of II<br>55% of IV<br>20% of I | 0.5<br><br>0.4 | 0.10<br><br>0.10 | 6 | 0.18 | 0.35 | 0.13 | 0.011 | 585; 3; 0.35 |
| EXAMPLE 3 | KAOLINITE<br>+<br>T$_i$O$_2$ | 50% of II<br>10% of IV<br>40% of I | 0.5<br><br>0.4 | 0.20<br><br>0.20 | 13 | 0.2 | 0.35 | 0.15 | 0.014 | |
| EXAMPLE 4 | KAOLINITE<br>+<br>T$_i$O$_2$ | 25% of III<br>55% of IV<br>20% of I | 0.6<br><br>0.4 | 0.10<br><br>0.10 | 6.6 | 0.22 | 0.36 | 0.15 | 0.015 | |
| EXAMPLE 5 | KAOLINITE<br>+<br>T$_i$O$_2$ | 50% of III<br>10% of IV<br>40% of I | 0.6<br><br>0.4 | 0.20<br><br>0.20 | 13.7 | 0.15 | 0.28 | 0.20 | 0.018 | 1590; 80; 14 |
| EXAMPLE 6 | KAOLINITE<br>+<br>T$_i$O$_2$ | 25% of III<br>35% of IV<br>40% of I | 0.6<br><br>0.4 | 0.10<br><br>0.20 | 11.6 | 0.17 | 0.3 | 0.15 | 0.015 | 1210; 85; 8 |
| EXAMPLE 7 | KAOLINITE<br>+<br>T$_i$O$_2$ | 80% of II<br>20% of I | 0.5<br>0.4 | 0.32<br>0.10 | 8.9 | 0.18 | 0.34 | 0.16 | 0.017 | |
| EXAMPLE 8 | KAOLINITE<br>+<br>T$_i$O$_2$ | 20% of II<br>16% of IV<br>64% of I | 0.5<br><br>0.4 | 0.08<br><br>0.32 | 15.8 | 0.18 | 0.35 | 0.12 | 0.011 | |

°This column indicates, in order, the number of peaks present, respectively, in the following ranges:
(0.15 to 0.29 $\mu$m; 0.29 to 0.44 $\mu$m; 0.44 to 0.79 $\mu$m).

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims.

What is claimed is:

1. A biaxially drawn, filled thermoplastic polyester film substrate, which comprises a biaxially stretched thermoplastic polyester film matrix comprising a particulate filler material distributed therethrough, said filler material comprising (a) from about 0.01% to 1% by weight thereof of kaolinite particles having a mean particle size no greater than about 1 micron, (b) from about 0.01% to 1% by weight thereof of titanium oxide particles also having a mean particle size no greater than about 1 micron, wherein the ratio by weight of said kaolinite particles (a) to said titanium oxide particles (b) ranges from 0.2 to 5, and the total amount of said kaolinite particles (a) and said titanium oxide particles (b) comprise from 0.05% to 1.2% by weight of said thermoplastic polyester.

2. The polyester film substrate as defined by claim 1, said kaolinite particles (a) having a mean particle size no greater than about 0.7 micron and said titanium oxide particles (b) having a mean particle size also no greater than about 0.7 micron.

3. The polyester film substrate as defined by claim 1, said thermoplastic polyester comprising at least 80% by weight of ethylene glycol terephthalate recurring units.

4. The polyester film substrate as defined by claim 3, said thermoplastic polyester comprising at least 90% by weight of ethylene glycol terephthalate recurring units.

5. The polyester film substrate as defined by claim 1, the ratio by weight of said kaolinite particles (a) to said titanium oxide particles (b) ranging from 0.5 to 2.

6. The polyester film substrate as defined by claim 1, the total amount of said kaolinite particles (a) and said titanium oxide particles (b) comprising from 0.1% to 0.7% by weight of said thermoplastic polyester.

7. The polyester film substrate as defined by claim 1, biaxially stretched to a draw ratio of from about 3 to 5 in both the longitudinal and transverse directions.

8. The polyester film substrate as defined by claim 7, having a total surface roughness, $R_t$, ranging from about 0.05 to 0.5.

9. The polyester film substrate as defined by claim 8 having an average surface roughness, $R_a$, ranging from about 0.005 0.05.

10. The polyester film substrate as defined by claim 9, having a coefficient of dynamic friction, $\mu_k$, ranging from about 0.15 to 0.5.

11. The polyester film substrate as defined by claim 1, having a thickness ranging from about 1 to 50 microns.

12. A magnetic recording tape comprising the polyester film substrate as defined by claim 1.

13. A capacitor comprising as a dielectric layer thereof, the polyester film substrate as defined by claim 1.

14. The polyester film substrate as defined by claim 9, having a coefficient of dynamic friction, $\mu_k$, ranging from about 0.15 to 0.2.

* * * * *